(12) United States Patent
Ji et al.

(10) Patent No.: US 12,094,247 B2
(45) Date of Patent: Sep. 17, 2024

(54) EXPRESSION RECOGNITION METHOD AND RELATED APPARATUS

(71) Applicant: Tencent Technology (Shenzhen) Company Limited, Shenzhen (CN)

(72) Inventors: Xing Ji, Shenzhen (CN); Yitong Wang, Shenzhen (CN); Zheng Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 770 days.

(21) Appl. No.: 17/322,710

(22) Filed: May 17, 2021

(65) Prior Publication Data
US 2021/0271862 A1    Sep. 2, 2021

Related U.S. Application Data

(63) Continuation of application No. PCT/CN2020/078579, filed on Mar. 10, 2020.

(30) Foreign Application Priority Data

Mar. 14, 2019 (CN) .......... 201910194881.8

(51) Int. Cl.
*G06K 9/00* (2022.01)
*G06F 18/214* (2023.01)
(Continued)

(52) U.S. Cl.
CPC .......... *G06V 40/176* (2022.01); *G06F 18/214* (2023.01); *G06N 3/08* (2013.01);
(Continued)

(58) Field of Classification Search
CPC .. G06V 40/176; G06V 10/454; G06V 10/751; G06V 10/764; G06V 10/82;
(Continued)

(56) References Cited

U.S. PATENT DOCUMENTS

2008/0201144 A1    8/2008  Song et al.
2015/0324632 A1*  11/2015  Whitehill ............ G06V 40/175
                                              382/159
(Continued)

FOREIGN PATENT DOCUMENTS

CN     106257489 A    12/2016
CN     106295566 A    1/2017
(Continued)

OTHER PUBLICATIONS

Donggeun Yoo et al., "AttentionNet: Aggregating Weak Directions for Accurate Object Detection", pub. 2015 (Year: 2015).*
(Continued)

*Primary Examiner* — Mekonen T Bekele
(74) *Attorney, Agent, or Firm* — Morgan, Lewis & Bockius LLP

(57) ABSTRACT

An electronic device obtains an image that includes a face. The device performs feature extraction on the image, to obtain facial expression information corresponding to the face and facial feature information corresponding to the facial expression, wherein the facial feature information indicates an extent of the facial expression. The device determines facial emotion information according to the facial expression information. The device also determines facial feature expression information according to a target feature value corresponding to the facial emotion and the facial feature information. This expression recognition techniques disclosed herein can implement multi-task learning and reduce an amount of data required for model training, and can obtain both an emotion recognition result and a local expression recognition result, thereby improving efficiency and real-time performance of expression recognition and improving user experience.

20 Claims, 11 Drawing Sheets

(51) Int. Cl.
    *G06N 3/08*     (2023.01)
    *G06V 10/44*     (2022.01)
    *G06V 10/75*     (2022.01)
    *G06V 10/764*     (2022.01)
    *G06V 10/82*     (2022.01)
    *G06V 40/16*     (2022.01)

(52) U.S. Cl.
    CPC .......... *G06V 10/454* (2022.01); *G06V 10/751* (2022.01); *G06V 10/764* (2022.01); *G06V 10/82* (2022.01); *G06V 40/171* (2022.01); *G06V 40/172* (2022.01)

(58) Field of Classification Search
    CPC .. G06V 40/171; G06V 40/172; G06F 18/214; G06N 3/08; G06N 3/044; G06N 3/045; G06N 20/10
    See application file for complete search history.

(56) References Cited

U.S. PATENT DOCUMENTS

2016/0275341 A1    9/2016    Li et al.
2018/0211102 A1    7/2018    Alsmadi
2019/0034706 A1*    1/2019    el Kaliouby ....... H04N 21/4223

FOREIGN PATENT DOCUMENTS

| CN | 107292256 A | 10/2017 |
|----|-------------|---------|
| CN | 107463888 A | 12/2017 |
| CN | 107633203 A | 1/2018 |
| CN | 107742107 A | 2/2018 |
| CN | 108108677 A | 6/2018 |
| CN | 109934173 A | 6/2019 |
| WO | WO 2017185630 A1 | 11/2017 |

OTHER PUBLICATIONS

Tencent Technology, WO, PCT/CN2020/078579, Jun. 8, 2020, 5 pgs.
Tencent Technology, IPRP, PCT/CN2020/078579, Aug. 25, 2021, 6 pgs.
Tencent Technology, ISR, PCT/CN2020/078579, Jun. 8, 2020, 3 pgs.

* cited by examiner

A          B

EXPRESSION RECOGNITION METHOD AND RELATED APPARATUS

CROSS-REFERENCE TO RELATED APPLICATIONS

This application is a continuation application of PCT Patent Application No. PCT/CN2020/078579, entitled "EXPRESSION RECOGNITION METHOD AND RELATED DEVICE" filed on Mar. 10, 2020, which claims priority to Chinese Patent Application No. 201910194881.8, filed with the State Intellectual Property Office of the People's Republic of China on Mar. 14, 2019, and entitled "EXPRESSION RECOGNITION METHOD AND APPARATUS, AND ELECTRONIC DEVICE", all of which are incorporated herein by reference in their entirety.

FIELD OF THE TECHNOLOGY

This application relates to the field of artificial intelligence (AI) technologies, and specifically, to an expression recognition technology.

BACKGROUND OF THE DISCLOSURE

With the rapid development of computer technologies, AI technologies, and related disciplines thereof, the entire society is increasingly automated, and people are more inclined to human-computer interaction that is similar to the way people communicate with each other. Expression recognition is a basis of emotion understanding, a prerequisite for a computer to understand emotions of people, and an effective way for people to explore and understand intelligence.

At present, there are a large quantity of deep learning-based methods in expression recognition. However, deep learning requires a large quantity of labeled samples to achieve desired performance, and sample search and labeling require a large amount of cost investment. In addition, the deep learning-based methods have high time complexity and complex network structures, making it difficult to run on ordinary front-end devices and mobile terminals in real time.

In view of this, a new expression recognition method is urgently needed in the art.

The information disclosed in the above background part is only used for enhancing the understanding of the background of this application. Therefore, information that does not constitute the related art known to a person of ordinary skill in the art may be included.

SUMMARY

Embodiments of this application provide an expression recognition method and a related apparatus, so as to at least conveniently and efficiently perform emotion and local expression recognition on an inputted face image to some extent.

Other features and advantages of this application become obvious through the following detailed descriptions, or may be partially learned through the practice of this application.

According to an aspect of this application, an expression recognition method is provided, comprising: obtaining an image that includes a face; performing feature extraction on the image, to obtain facial expression information corresponding to the face and facial feature information, wherein the facial feature information indicates an extent of the facial expression; determining facial emotion information according to the facial expression information; and determining facial feature expression information according to a target feature value to the facial emotion and the facial feature information.

According to another aspect of this application, an expression recognition apparatus is provided, including: an image obtaining module, configured to obtain a face image; a feature extraction module, configured to perform feature extraction on the face image, to obtain first type information (e.g., facial expression information, facial emotion information, etc.) and second type information (e.g., facial feature information, identification of a facial feature of the face, etc.); a first recognition module, configured to obtain global feature information according to the first type information, and determine first expression information (e.g., facial emotion information) according to the global feature information; and a second recognition module, configured to obtain a target feature value according to the second type information, and determine second expression information (e.g., facial feature expression information) according to the target feature value.

In some embodiments of this application, based on the foregoing solutions, the feature extraction module includes: an input unit, configured to input the face image to a key point learning model, the key point learning model including a backbone network and a key point recognition network connected to the backbone network; a feature extraction unit, configured to perform feature extraction on the face image through the backbone network, to obtain the first type information; and an information processing unit, configured to process the first type information through the key point recognition network, to obtain the second type information.

In some embodiments of this application, based on the foregoing solutions, the feature extraction unit is configured to: perform convolution-activation-element addition-pooling operations on the face image through the backbone network, to obtain the first type information.

In some embodiments of this application, the key point recognition network is a fully connected layer. Based on the foregoing solutions, the information processing unit is configured to: integrate the first type information through the fully connected layer, to obtain the second type information.

In some embodiments of this application, based on the foregoing solutions, the first recognition module includes: a first recognition unit, configured to integrate the first type information by using a first expression recognition module, to obtain the global feature information; and classify the global feature information, to obtain the first expression information.

In some embodiments of this application, based on the foregoing solutions, the first expression recognition module is a multi-layer perceptron model, and the multi-layer perceptron model includes a first fully connected layer, a second fully connected layer, and an output layer that are sequentially connected.

In some embodiments of this application, the first expression information is an emotion probability value. Based on the foregoing solutions, the first recognition unit is configured to: perform multi-dimensional mapping on the first type information through the first fully connected layer, to output feature information; integrate the feature information through the second fully connected layer, to obtain the global feature information; and perform normalization processing on the global feature information through the output layer, to obtain the emotion probability value.

In some embodiments of this application, based on the foregoing solutions, the second recognition module includes: a second recognition unit, configured to perform calculation on the second type information by using a second expression recognition module to obtain the target feature value, and determine the second expression information according to the target feature value.

In some embodiments of this application, the second type information includes key point coordinates and key point marks, and the second expression information is an expression probability value corresponding to an action unit in the face image. Based on the foregoing solutions, the second recognition unit includes: a first determining unit, configured to determine a target action unit in the face image according to the key point marks; a second determining unit, configured to determine feature points of the target action unit, and target key point coordinates corresponding to the feature points; a feature value calculation unit, configured to calculate the target feature value according to the target key point coordinates; and a probability calculation unit, configured to obtain the expression probability value according to the target feature value, a first parameter, and a second parameter.

In some embodiments of this application, based on the foregoing solutions, the target feature value includes at least one of an aspect ratio, a slope, and a curvature, and the first parameter is a preset slope, and the second parameter is a preset bias value.

In some embodiments of this application, based on the foregoing solutions, the probability calculation unit is configured to: determine a state value according to the target feature value, the first parameter, and the second parameter; compare the state value with 0, to determine a maximum value; and compare the maximum value with 1, to determine a minimum value, and use the minimum value as the expression probability value.

In some embodiments of this application, the second type information includes key point coordinates and key point marks, and the second expression information is an expression probability value corresponding to an action unit in the face image. Based on the foregoing solutions, the second recognition unit is configured to: determine a target action unit in the face image according to the key point marks; match key point coordinates corresponding to the target action unit against key point coordinates corresponding to the key point marks in a plurality of preset templates, to obtain a plurality of target feature values; and perform normalization processing on the plurality of target feature values, to obtain the expression probability value.

In some embodiments of this application, based on the foregoing solutions, the expression recognition apparatus further includes: a coordinate processing module, configured to perform coordinate scale normalization processing on the key point coordinates before the target action unit in the face image is determined according to the key point marks.

According to an aspect of the embodiments of this application, an electronic device is provided. The electronic device comprises one or more processors and memory configured to store one or more programs, the one or more programs, when executed by the one or more processors, cause the one or more processors to perform any of the methods disclosed herein.

According to an aspect of the embodiments of this application, a non-transitory computer-readable storage medium is provided. The non-transitory computer-readable storage medium stores a computer program, the computer program, when executed by one or more processors, cause the one or more processors to perform any og the methods disclosed herein.

In the technical solutions provided in some embodiments of this application, image feature extraction is performed on an obtained face image, to obtain first type information and second type information; global feature information is obtained according to the first type information, and first expression information is determined according to the global feature information; and a target feature value is obtained according to the second type information, and second expression information is determined according to the target feature value. In the technical solutions of this application, on the one hand, different expression information can be determined according to different types of information obtained through feature extraction, thereby implementing multi-task learning and reducing an amount of data required for training a model of feature extraction. On the other hand, the different expression information determined may be, for example, an emotion recognition result and a local expression recognition result, that is, in this application, the emotion recognition result and the local expression recognition result can both be obtained, thereby improving efficiency and real-time performance of expression recognition and improving user experience.

It is to be understood that the above general descriptions and the following detailed descriptions are merely for exemplary and explanatory purposes, and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Figure 1:
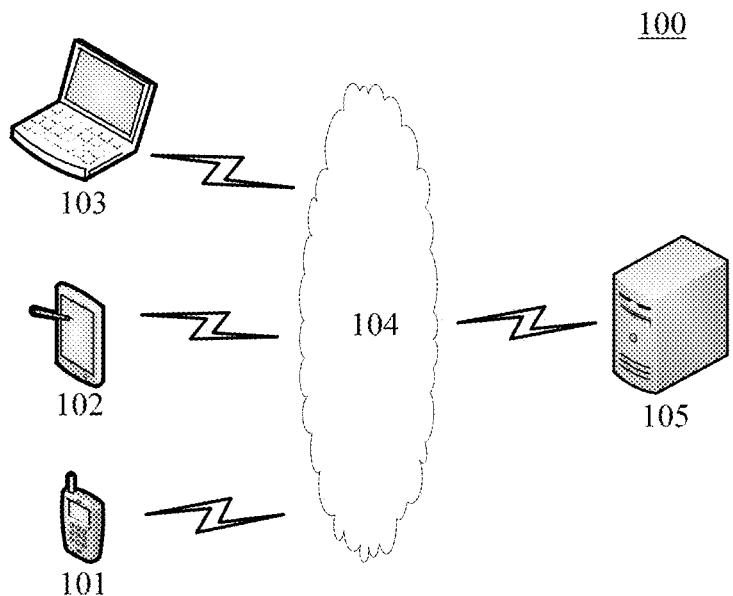
FIG. 1 is a schematic diagram of an exemplary system architecture to which a technical solution according to an embodiment of this application is applicable.

Now, exemplary implementations are described more comprehensively with reference to the accompanying drawings. However, the exemplary embodiments can be implemented in various forms and are not be understood as being limited to examples herein. Conversely, such implementations are provided to make this application more comprehensive and complete, and fully convey the concepts of the exemplary implementations to a person skilled in the art.

In addition, the described features, structures, or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, to avoid obscuring aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

An expression recognition method provided in the embodiments of this application may be implemented based on AI. AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand essence of intelligence and produces a new intelligent machine that can respond in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a computer vision (CV) technology, a speech technology, a natural language processing technology, and machine learning (ML)/deep learning.

CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. CV technologies usually include technologies such as image processing, image recognition, image semantic understanding, video processing, video semantic understanding, video content/behavior recognition, and further include biological feature recognition technologies such as common face recognition and fingerprint recognition.

ML is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

The solutions provided in the embodiments of this application relate to technologies such as CV, ML, and/or deep learning of AI. A system automatically detects and locates a face in an image, and extracts, from the image, a series of effective information representing an expression, to analyze a basic expression and emotion of the face. Details are described by using the following embodiments.

FIG. 1 is a schematic diagram of an exemplary system architecture to which a technical solution according to an embodiment of this application is applicable.

As shown in FIG. 1, a system architecture 100 may include a terminal device (which may be one or more of a smartphone 101, a tablet computer 102, and a portable computer 103 shown in FIG. 1, or certainly may be a desktop computer, a camera, and the like), a network 104, and a server 105. The network 104 is a medium configured to provide a communication link between the terminal device and the server 105. The network 104 may include various connection types, for example, a wired communication link and a wireless communication link.

It is to be understood that the quantities of terminal devices, networks, and servers in FIG. 1 are only schematic. There may be any quantities of terminal devices, networks, and servers according to an actual requirement. For example, the server 105 may be a server cluster including a plurality of servers.

In an embodiment of this application, a user may obtain an image that includes a face (e.g., a face image) and transmit image to the server 105 by using the terminal device 101 (or the terminal device 102 or 103). After receiving the face image transmitted by the terminal device 101, the server 105 may perform feature extraction on the face image, to obtain first type information and second type information; obtain global feature information according to the first type information, and determine first expression information according to the global feature information; and obtain a target feature value according to the second type information, and determine second expression information according to the target feature value. For example, in some embodiments, the first type information can comprise facial expression information or facial emotion information. In some embodiments, the first expression information can comprise facial emotion expression or facial emotion expression information. In some embodiments, the second type information can comprise facial feature information or information that identifies a facial feature of the face. In some embodiments, the second expression information can comprise facial expression feature information (e.g., expression corresponding to a particular feature of the face, such as an eyebrow expression, a moth expression etc.).

In the related art, facial expression analysis generally includes two directions. One is to classify expressions into specific categories. There are seven common categories, including normal, happy, sad, angry, surprised, scared, and disgusted. This direction is facial emotion recognition. The other is to divide a facial expression into different local actions, for example, mouth corner raising, pouting, and frowning, which is generally referred to as facial action unit recognition.

The first expression information may be used for representing an emotion recognition result of the face image, and the first expression information may be, for example, a predicted emotion value of the face image. The second expression information may be used for representing a local expression, for example, an action unit (e.g., a particular feature of the face), in the face image, and the second expression information may be, for example, a predicted expression value of the action unit (for example, eyes, eyebrows, or a mouth) in the face image. In the technical solutions of the embodiments of this application, on the one hand, different expression information can be determined according to different types of information obtained through feature extraction, thereby implementing multi-task learning and reducing an amount of data required for training a model of feature extraction. On the other hand, an emotion recognition result and a local expression recognition result can both be obtained, thereby improving efficiency and real-time performance of expression recognition and improving user experience.

The expression recognition method provided in the embodiments of this application is generally performed by the server 105. Accordingly, the expression recognition apparatus is generally disposed in the server 105. In this case, an electronic device that performs the expression recognition method is a server. However, in another embodiment of this application, the terminal device may also have functions similar to those of the server, so as to perform the expression recognition solutions provided in the embodiments of this application. In this case, an electronic device that performs the expression recognition method is a terminal device.

The facial emotion recognition is generally divided into facial feature extraction and facial expression classification. Common facial feature extraction methods include a local binary pattern (LBP) method, a histogram of oriented gradient (HOG) method, a scale-invariant feature transform (SIFT) method, and the like. First, feature extraction is performed on a detected face image by using a facial feature extraction method, to obtain a feature vector of a face. Then, a classifier is trained to classify expressions. Common classifiers include K-Nearest Neighbor (KNN), a support vector machine (SVM), adaptive boosting (Adaboost), and the like. An expression is determined based on the extracted features by using the classifier. In recent years, with the development of the deep learning technology in the field of image processing, the deep learning technology has also been applied to the study of facial expression classification. A large quantity of labeled samples are learned through a convolutional neural network (CNN) to obtain an end-to-end network structure. A face image may be directly inputted to the structure to output a classification probability of each expression. Alternatively, a deep learning model combined with a recurrent neural network (RNN) model and a CNN model is used to average results predicted at different time points to obtain a result of expression prediction. A deep learning model combined with two CNN models is used, one being configured to extract surface features of a face in the image, and the other being configured to extract shape features of the face in the image. Results outputted by the two CNN models are fused when a decision is made.

In the facial action unit recognition, a method in the related art is to use some non-parametric classification methods to predict a category of a facial expression according to normalized distances of key points and an angle relationship between the key points. Another method is to extract HOG features of the face image, and perform classification by using a linear SVM. Alternatively, in a CNN-based method, a large quantity of samples are used for the network to learn prediction of 50 face action units, a CNN is used to extract spatial features of the face image, and an LSTM is used to learn fusion of CNN features at different time points to output 11 face action units, so as to improve accuracy of a prediction result.

However, the related art has corresponding deficiencies, which are mainly reflected in the following two aspects: (1) Deep learning requires a large quantity of labeled samples to achieve desired performance, and sample collection and labeling both require a large amount of cost investment. (2) The existing deep learning methods have high time complexity, network structures are complex, and many CNN-based methods cannot be run on ordinary front-end devices and mobile terminals in real time, not to mention RNN-based time-domain fusion methods. Because of the problems, it is difficult to implement the existing deep learning technology.

In view of the problems in the related art, the embodiments of this application provide an expression recognition method first. The implementation details of the technical solutions in the embodiments of this application are described below in detail.

Figure 2:
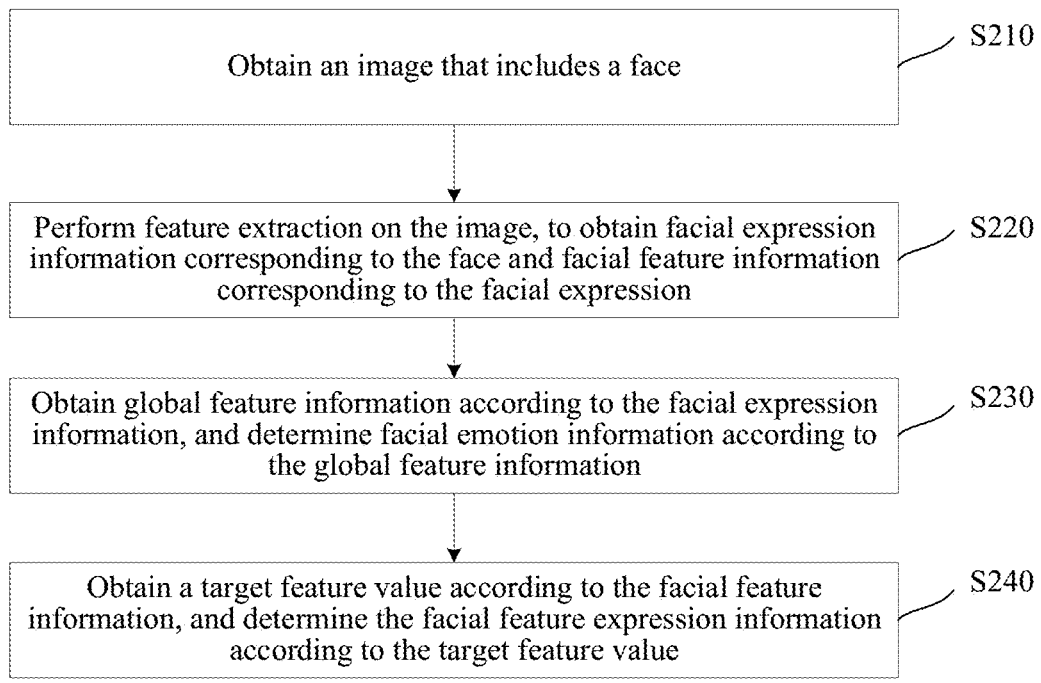
FIG. 2 is a schematic flowchart of an expression recognition method according to an embodiment of this application.

FIG. 2 is a flowchart of an expression recognition method according to an embodiment of this application. The expression recognition method may be performed by a server, and the server may be the server shown in FIG. 1. Referring to FIG. 2, the expression recognition method includes at least S210 to S240. A detailed description is as follows:

S210. Obtain an image that includes a face (e.g., a face image).

In an embodiment of this application, the server may obtain the face image by using the terminal device 101 (or the terminal device 102 or 103). Specifically, a face of a target object may be photographed by using a built-in photographing unit (e.g., a camera) of the terminal device 101 or an external photographing apparatus connected to the terminal device 101, to obtain the face image. Alternatively, the terminal device 101 may be connected to a data network, to obtain the face image by browsing and downloading network resources. Alternatively, the face image may be obtained from a folder storing images in the terminal device 101. A specific manner of obtaining the face image is not limited in this embodiment of this application.

S220. Perform feature extraction on the image, to obtain facial expression information corresponding to the face (e.g., first type information) and facial feature information corresponding to the facial expression (e.g., second type information), herein the facial feature information indicates an extent of the facial expression.

In an embodiment of this application, after the server obtains the face image, the server may perform feature extraction on the face image, and predict a facial expression according to extracted feature information. In this embodiment of this application, the face image may be inputted to a key point learning model, to perform feature extraction on the face image. The key point learning model is an ML model, for example, may be a CNN model or an RNN model. This is not specifically limited in this embodiment of this application.

It is to be understood that expression analysis generally includes emotion recognition and local expression recognition. Therefore, when feature extraction is performed on the face image, different network nodes may be set, to obtain different feature information through the different network nodes. For example, two network nodes may be set in the key point learning model, and the first type information and the second expression information may be respectively obtained from the two network nodes. The first type information may be used for determining first expression information. The second type information may be used for determining second expression information. The first expression information may be a predicted emotion value obtained by predicting an emotion in the face image. The second type information may be a predicted expression value obtained by predicting an expression of an action unit in the face image. Certainly, the first expression information may alternatively be the predicted expression value obtained by predicting the expression of the action unit in the face image, and the second expression information may alternatively be the predicted emotion value obtained by predicting the emotion in the face image. For ease of understanding, in this embodiment of this application, description is made by using an example in which the first expression information is the predicted emotion value and the second expression information is the predicted expression value.

Figure 3:
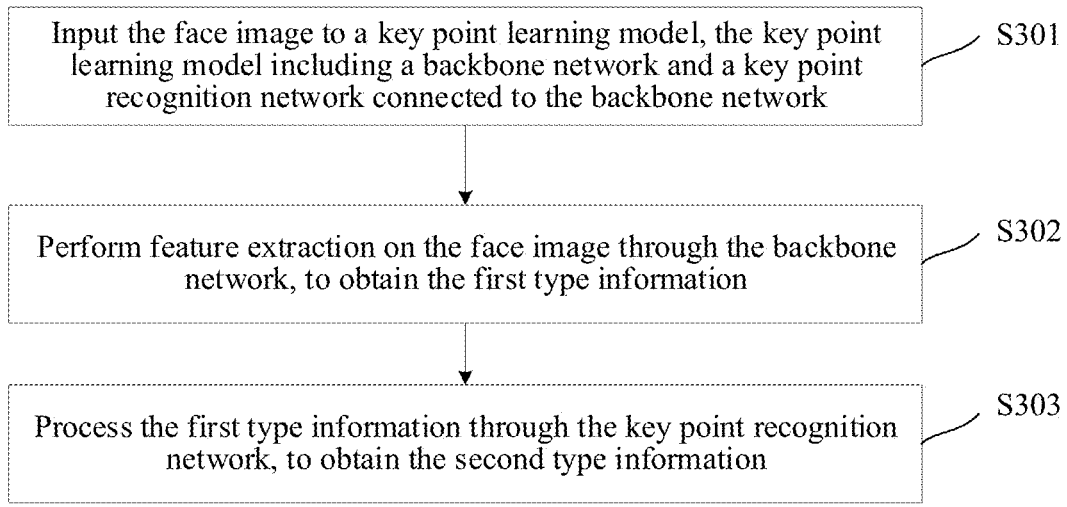
FIG. 3 is a schematic flowchart of obtaining first type information and second type information according to an embodiment of this application.

In an embodiment of this application, FIG. 3 is a schematic flowchart of obtaining first type information and second type information, including the following steps: S301. The server inputs the face image to a key point learning model, the key point learning model including a backbone network and a key point recognition network connected to the backbone network. S302. Perform feature extraction on the face image through the backbone network, to obtain the first type information. The first type information may be information used for obtaining the first expression information, or may be information used for obtaining the second expression information. S303. Process the first type information through the key point recognition network, to obtain the second type information. The second type information is different from the first type information, and may be information used for obtaining the second expression information, or may be information used for obtaining the first expression information.

Figure 4:
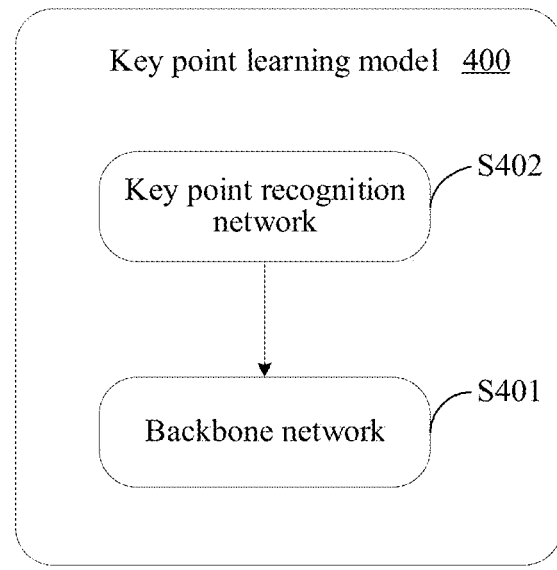
FIG. 4 is a schematic structural diagram of a key point learning model according to an embodiment of this application.

In an embodiment of this application, FIG. 4 is a schematic structural diagram of a key point learning model 400. As shown in FIG. 4, the key point learning model 400 includes a backbone network 401 and a key point recognition network 402, and the backbone network 401 is connected to the key point recognition network 402. After the server obtains the face image, the face image is inputted to the backbone network 401, and the backbone network 401 performs feature extraction on the face image, to obtain the first type information. Then, the key point recognition network 402 receives the first type information, and processes the first type information, to obtain the second type information. The backbone network 401 may be a network model such as a CNN model or an RNN model. To make the technical solutions in the embodiments of this application more clearly, the CNN is used as an example below to illustrate a structure of the backbone network 401.

Figure 5:
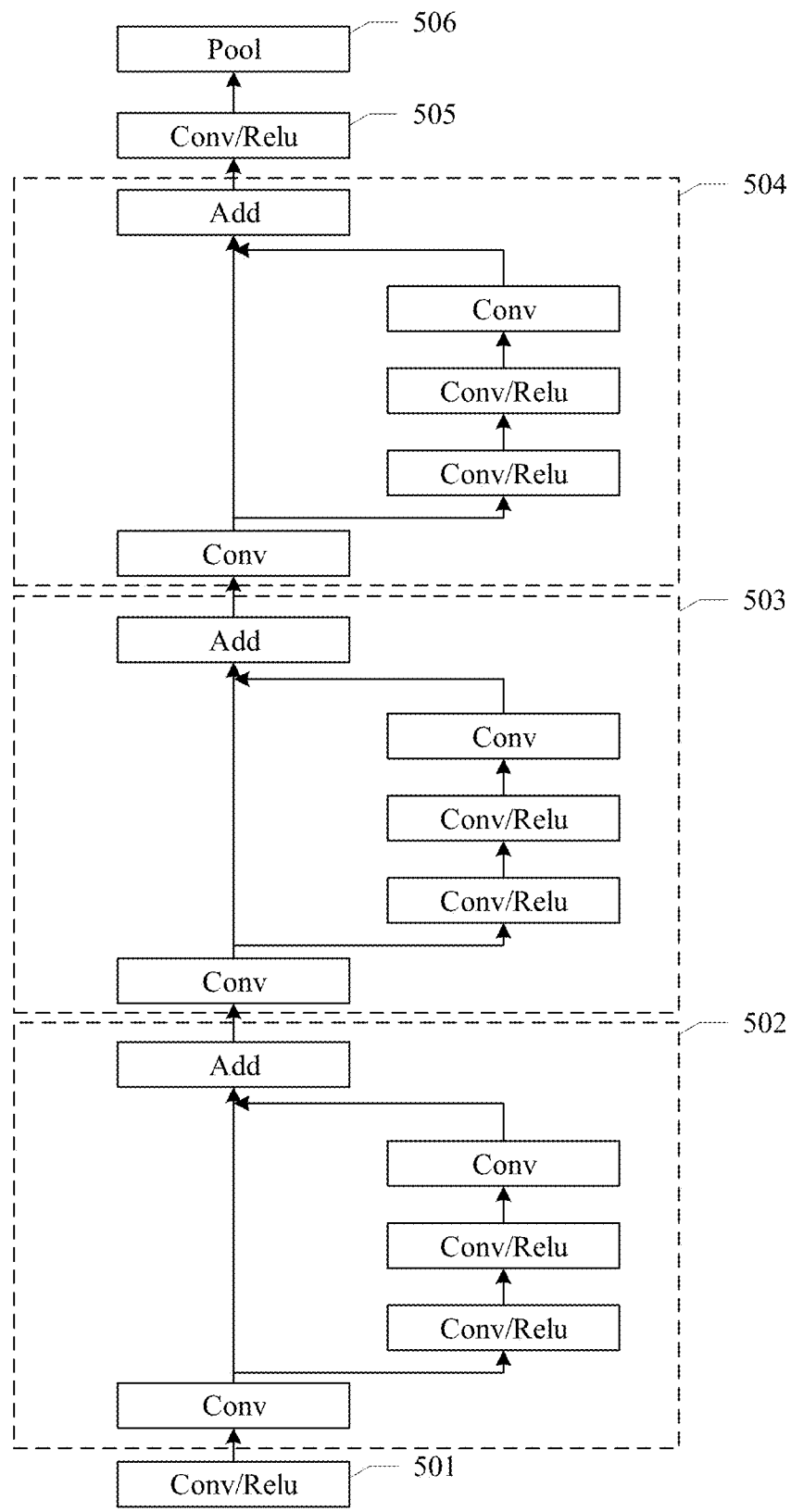
FIG. 5 is a schematic structural diagram of a backbone network according to an embodiment of this application.

Further, FIG. 5 is a schematic structural diagram of the backbone network 401. As shown in FIG. 5, the backbone network 401 includes a first processing unit 501, a second processing unit 502, a third processing unit 503, a fourth processing unit 504, a fifth processing unit 505, and a sixth processing unit 506. The first processing unit 501 and the fifth processing unit 505 both include a convolutional layer Cony and an activation layer Relu. The first processing unit 501 may perform preliminary image feature extraction on the inputted face image. The fifth processing unit 505 may perform further convolution-activation operations on features outputted from the fourth processing unit 504, to obtain more comprehensive image feature information. The second processing unit 502, the third processing unit 503, and the fourth processing unit 504 have the same structure, and all include a first branch and a second branch. Specifically, the first branch includes a convolutional layer Conv and an element addition layer Add. The second branch has a plurality of convolutional layers Conv and activation layers Relu added based on the first branch. For example, a structure of the second branch may be convolutional layer-convolutional layer-activation layer-convolutional layer-activation layer-convolutional layer-element addition layer, the element addition layer at the end can fuse features outputted by the first branch and the second branch, to obtain more abundant and more comprehensive image feature information. The sixth processing unit 506 may be a pooling layer Pool for performing down-sampling on image features outputted by the fifth processing unit 505, to obtain the first type information. In other words, the first type information is obtained by performing a series of operations of convolution-activation-element addition-pooling on the face image through the backbone network.

In an embodiment of this application, the key point recognition network 402 may be connected to the pooling layer, that is, the sixth processing unit 506, at the end of the backbone network 401. The key point recognition network 402 may be, for example, a fully connected layer, which can receive local image feature information with category distinction (that is, the first type information) outputted by the sixth processing unit 506, and integrate the received local image feature information, to obtain the second type information. The second type information may be, for example, key point coordinate information in the face image.

Structures and parameters of the networks in the key point learning model 400 may be set and trained according to actual requirements. For example, for the second processing unit 502, the third processing unit 503, and the fourth processing unit 504 in the backbone network 401, a specific quantity of the processing units may alternatively be other values. However, for ease of use on a front-end or mobile device and improving data processing efficiency of the device, the specific quantity cannot be set excessively large.

S230. Obtain global feature information according to the facial expression information (e.g., first type information), and determine facial emotion information (e.g., first expression information) according to the global feature information.

In an embodiment of this application, the first expression information may be a facial emotion probability value obtained according to the first type information extracted from the face image. In some embodiments, to improve accuracy of emotion prediction, the server may input the facial expression information to a first expression recognition module, integrate the facial expression information by using the first expression recognition module, to obtain the global feature information (e.g., an integrated facial expression expression), and classify the obtained global feature information, to obtain the emotion information (e.g., first expression information).

Figure 6:
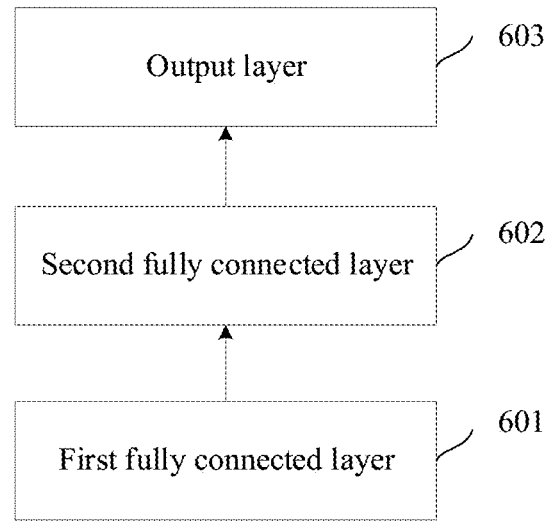
FIG. 6 is a schematic structural diagram of a multi-layer perceptron according to an embodiment of this application.

In an embodiment of this application, the first expression recognition module may be a multi-layer perceptron model. FIG. 6 is a schematic structural diagram of a multi-layer perceptron model. As shown in FIG. 6, the multi-layer perceptron model 600 includes a first fully connected layer 601, a second fully connected layer 602, and an output layer 603. The first fully connected layer 601 may be a 256-dimensional fully connected layer, which is connected to the sixth processing unit 506 of the backbone network 401 and configured to receive local image feature information, that is, the first type information, outputted by the sixth processing unit 506. The second fully connected layer 602 may be a 7-dimensional fully connected layer, which is connected to the first fully connected layer 601 and configured to receive feature information outputted by the first fully connected layer 601, and process the feature information to obtain the global feature information. The output layer 603 may be a classifier, for example, may be a softmax layer, which is connected to the second fully connected layer 602 and configured to process the global feature information to obtain the first expression information.

Figure 7:
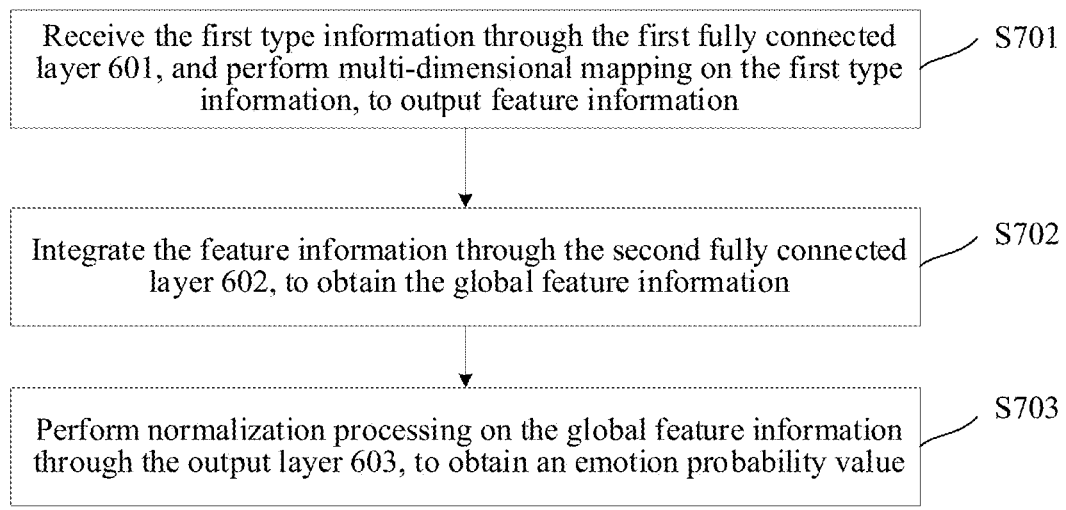
FIG. 7 is a schematic flowchart of obtaining first expression information according to an embodiment of this application.

The first expression information is obtained based on the multi-layer perceptron model shown in FIG. 6, and the obtained first expression information may be an emotion probability value. FIG. 7 is a schematic flowchart of obtaining first expression information, including the following steps: S701. The server receives the first type information through the first fully connected layer 601, and performs multi-dimensional mapping on the first type information, to output feature information. The first fully connected layer 601 performs multi-dimensional mapping on the first type information, and learns feature output required by the first expression recognition module, to output the feature information. S702. Integrate the feature information through the second fully connected layer 602, to obtain the global feature information (S701 and S702 correspond to the integrating the first type information by using the first expression recognition module, to obtain the global feature information). S703. Perform normalization processing on the global feature information through the output layer 603, to obtain the emotion probability value (S703 corresponds to the classifying the obtained global feature information, to obtain the first expression information).

In an embodiment of this application, a dimension of the second fully connected layer 602 is related to to-be-recognized emotion types. Generally, emotion categories of a face may include seven categories: normal, happy, sad, angry, surprised, scared, and disgusted. Therefore, the dimension of the second fully connected layer 602 may be set to seven. Certainly, the dimension of the second fully connected layer 602 may alternatively be changed according to a specific quantity of to-be-recognized emotion types. This is not specifically limited in this application.

S240. Obtain a target feature value according to the facial feature information (e.g., second type information), and determine facial feature expression information (e.g., second expression information) according to the target feature value. In some embodiments, the target feature value is a value corresponding to (e.g., associated with) the facial emotion and the facial feature information.

In an embodiment of this application, the second expression information may be an expression probability value corresponding to an action unit (e.g., a facial feature) in the face. That is to say, the action unit may refer to a part in the face image that performs an action, for example, a mouth, lips, eyebrows, eyes, chin, etc. of the face. To predict specific expressions of the action units, for example, whether the eyes are open or closed, whether the mouth is open or closed or is subject to pouting, and whether the eyebrows are raised or shrunk, the server may perform calculation according to second type information corresponding to the action units, to obtain corresponding expression probability values.

In an embodiment of this application, the server may input the second type information to a second expression recognition module, process the second type information by using the second expression recognition module to obtain the target feature value, and determine the second expression information according to the target feature value. In this embodiment of this application, the second type information may include key point information corresponding to the action units, the key point information may include key point coordinates and key point marks, and the target feature value may be obtained according to the key point information.

Figure 8:
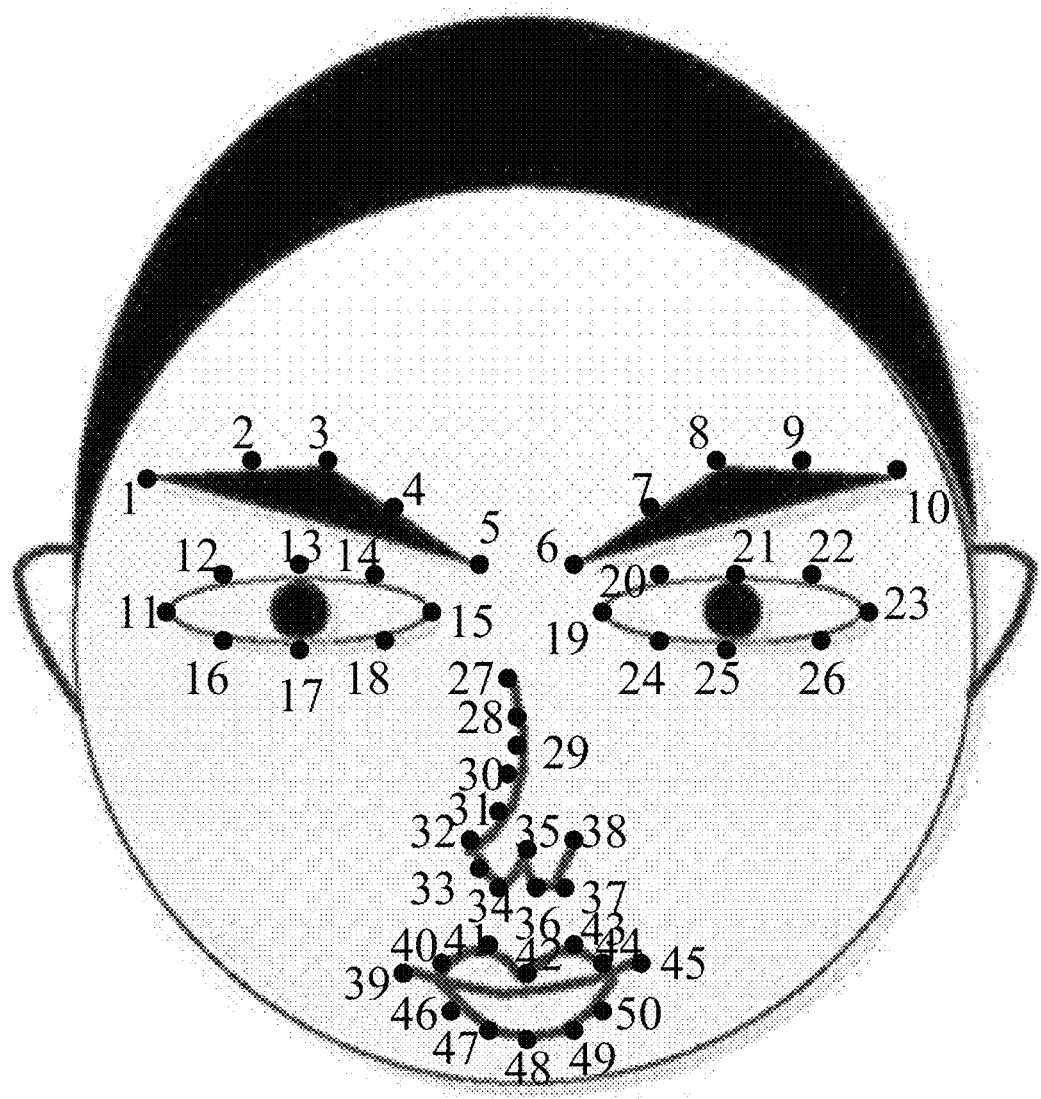
FIG. 8 is a schematic diagram of obtaining second type information according to an embodiment of this application.

In an embodiment of this application, the key point learning model 400 is a model obtained through training. When the key point learning model 400 is trained, second type information of a plurality of groups of samples may be inputted to a to-be-trained key point learning mode. Second type information of each sample includes sample key point marks and sample key point coordinates. The sample key point marks may be formed by numbering key points corresponding to action units in the sample according to a specific order, and the sample key point coordinates are coordinate information corresponding to the key points. Parameters of the key point learning model are adjusted a plurality of times, to minimize a loss function of the key point learning model, so as to obtain a stable key point learning model 400. After the training of the to-be-trained key point learning model is completed, the face image may be inputted to the key point learning model 400, to perform feature extraction on the face image sequentially through the backbone network 401 and the key point recognition network 402 in the key point learning model 400, so as to obtain a plurality of pieces of second type information in the face image. Then, key point coordinates and key point marks of key points may be obtained. FIG. 8 is a schematic diagram of second type information. As shown in FIG. 8, there are 50 key point marks in a face image 800. According to a marking order from top to bottom and from left to right, there are 5 key point marks 1-5 on the left eyebrow, 5 key point marks 6-10 on the right eyebrow, 8 key point marks 11-18 on the left eye, 8 key point marks 19-26 on the right eye, 12 key point marks 27-38 on the nose, and 12 key point marks 39-50 on the mouth. Correspondingly, each key point with a key point mark further has key point coordinates corresponding to the key point. Certainly, the key point marks in FIG. 8 are only examples for description. During training, a quantity and marks of the key points may be set according to actual requirements. This is not specifically limited in this application.

Figure 9:
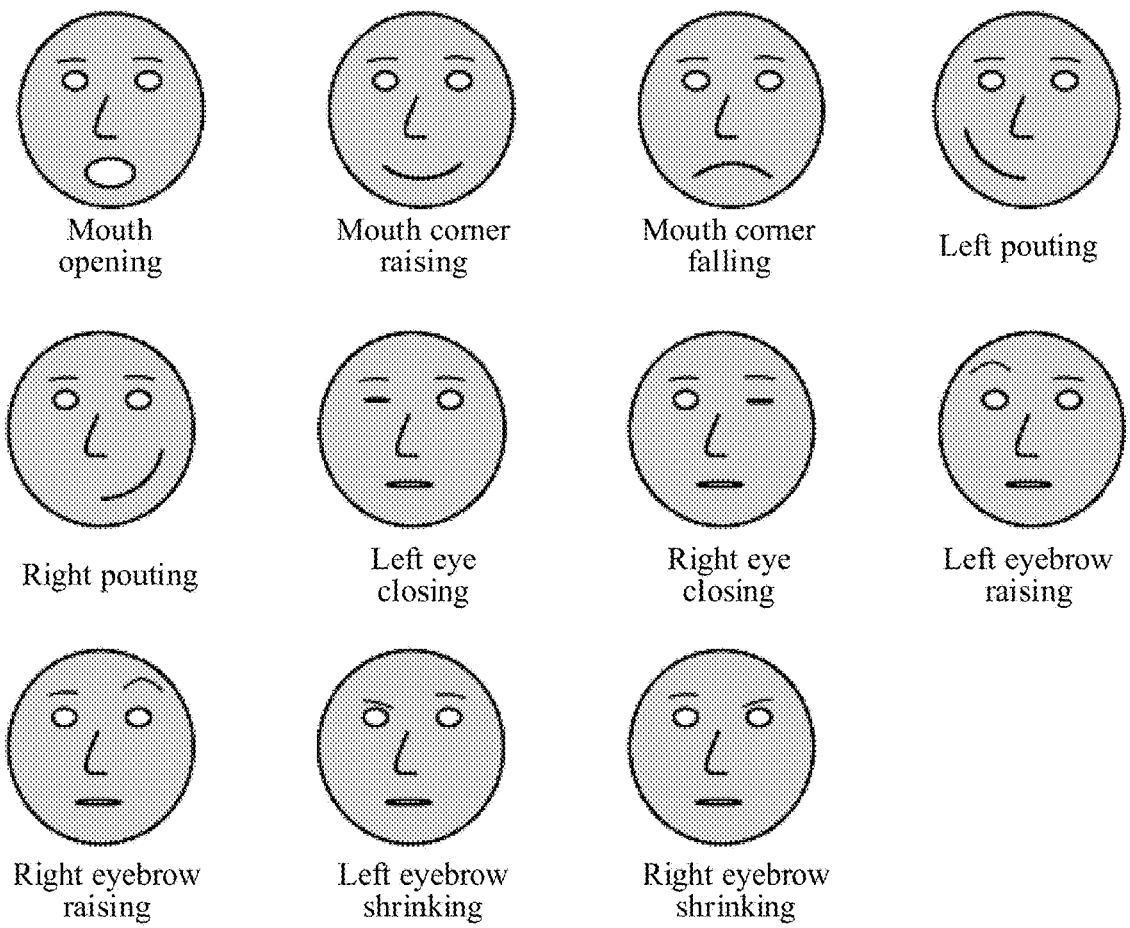
FIG. 9 is a schematic diagram of facial action units according to an embodiment of this application.

In an embodiment of this application, a total of 11 facial action units are designed, including five mouth-related actions, two eye-related actions, and four eyebrow-related actions. FIG. 9 is a schematic diagram of facial action units. As shown in FIG. 9, the 11 facial action units are specifically: mouth opening, mouth corner raising, mouth corner falling, left pouting, right pouting, left eye closing, right eye closing, left eyebrow raising, right eyebrow raising, left eyebrow shrinking, and right eyebrow shrinking.

In an embodiment of this application, after the second type information outputted by the key point learning model 400 is obtained, the action units may be distinguished based on the second type information, and calculation is performed according to the key point coordinates corresponding to the action units, to obtain the expression probability values corresponding to the action units. Considering that inputted face images may differ in factors such as scale, rotation angle, and light intensity, scale normalization processing may be performed on the key point coordinates in the second type information, to eliminate face problems caused by rotation, scale, or other factors, so that the obtained second type information is consistent.

Figure 10:
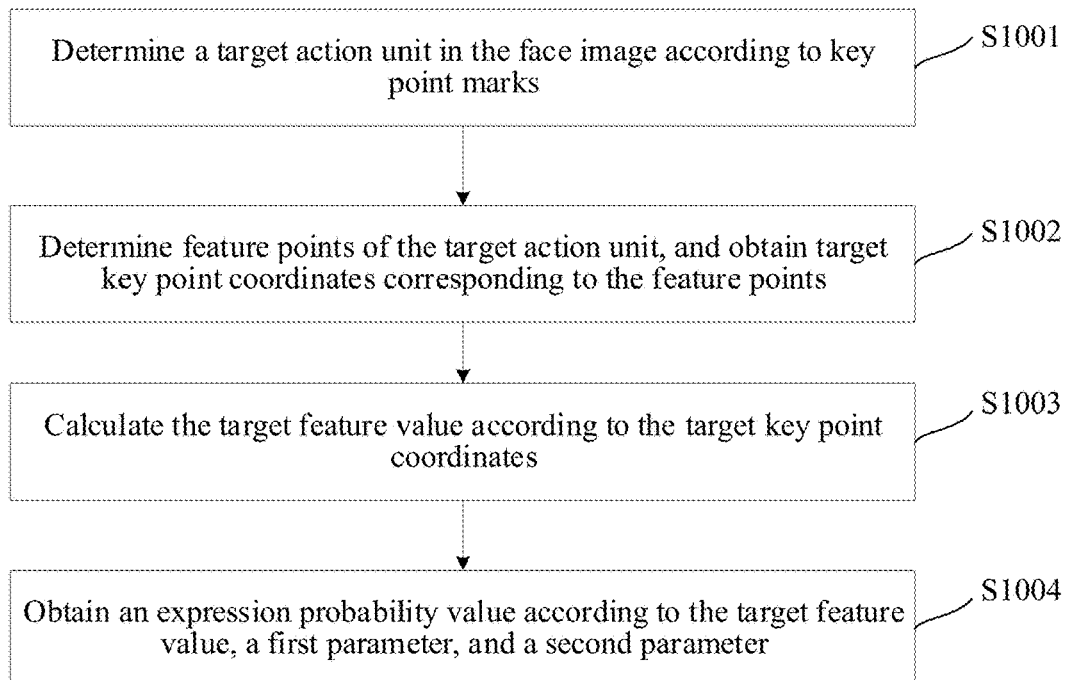
FIG. 10 is a schematic flowchart of a method for determining second expression information according to an embodiment of this application.

In an embodiment of this application, according to the second type information after the scale normalization, expressions of the action units in the face image may be predicted. FIG. 10 is a schematic flowchart of a method for determining second expression information. As shown in FIG. 10, the method for determining second expression information includes at least S1001 to S1003. A detailed description is as follows:

S1001. Determine a target action unit in the face image according to the key point marks.

In an embodiment of this application, the server performs feature extraction on the face image through the key point learning model to obtain the second type information including the key point coordinates and the key point marks. A marking order of the key point marks is the same as that in the sample training. Therefore, the target action unit in the second type information may be determined according to the key point marks corresponding to the action unit.

Figure 11:
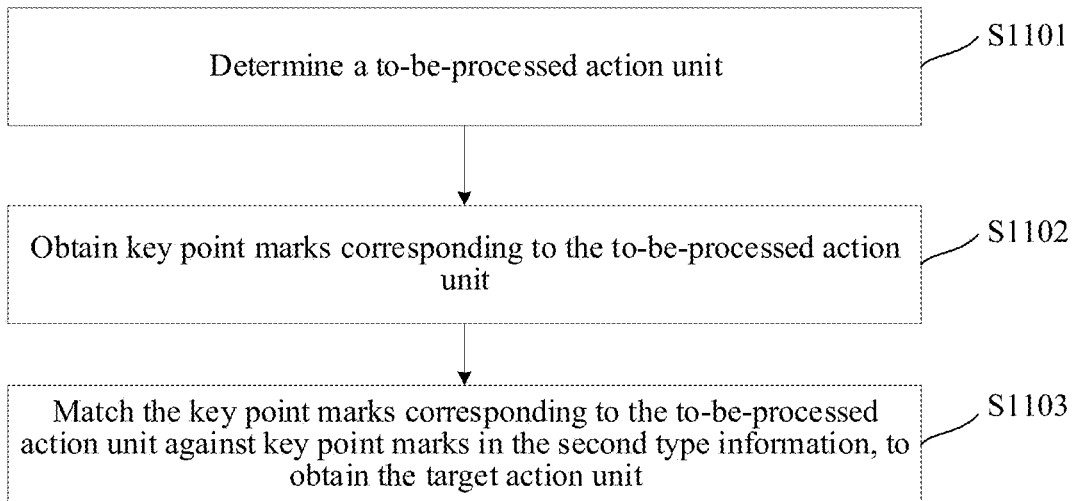
FIG. 11 is a schematic flowchart of a method for determining a target action unit according to an embodiment of this application.

FIG. 11 is a schematic flowchart of a method for determining a target action unit, including the following steps: S1101. Determine a to-be-processed action unit. S1102. Obtain key point marks corresponding to the to-be-processed action unit. For example, the left eye is determined as the to-be-processed action unit, and key point marks corresponding to the left eye may be obtained. Still referring to FIG. 8, if the left eye is determined as the to-be-processed action unit, the corresponding key point marks 10-18 may be obtained, and the target action unit is determined according to the key point marks. S1103. Match the key point marks corresponding to the to-be-processed action unit against the key point marks in the second type information, to obtain the target action unit. For example, the key point marks determined in S1102 may be matched against the key point marks in the second type information, and the target action unit is determined according to key point marks that are successfully matched.

S1002. Determine feature points of the target action unit, and obtain target key point coordinates corresponding to the feature points.

In an embodiment of this application, after determining the target action unit, the server may obtain key point coordinates corresponding to the target action unit, that is, the target key point coordinates, and obtain the target feature value according to the key point coordinates. In a possible implementation, first, after determining the target action unit, the server may determine the feature points of the target action unit. For example, when the target action unit is an eye, key points corresponding to an inner eye corner, an outer eye corner, a highest point of the upper eyelid, and a lowest point of the lower eyelid may be used as feature points. When the target action unit is an eyebrow, key points corresponding to two ends of the eyebrow and an eyebrow peak may be used as feature points. Then, target key point coordinates corresponding to the feature points are obtained.

S1003. Calculate the target feature value according to the target key point coordinates.

In an embodiment of this application, after the target key point coordinates corresponding to the feature points are obtained, the target feature value may be calculated according to the target key point coordinates. The target feature value may be at least one of an aspect ratio, a slope, and a curvature, and the target feature value varies with different to-be-recognized local expressions.

S1004. Obtain an expression probability value according to the target feature value, a first parameter, and a second parameter.

Figure 12:
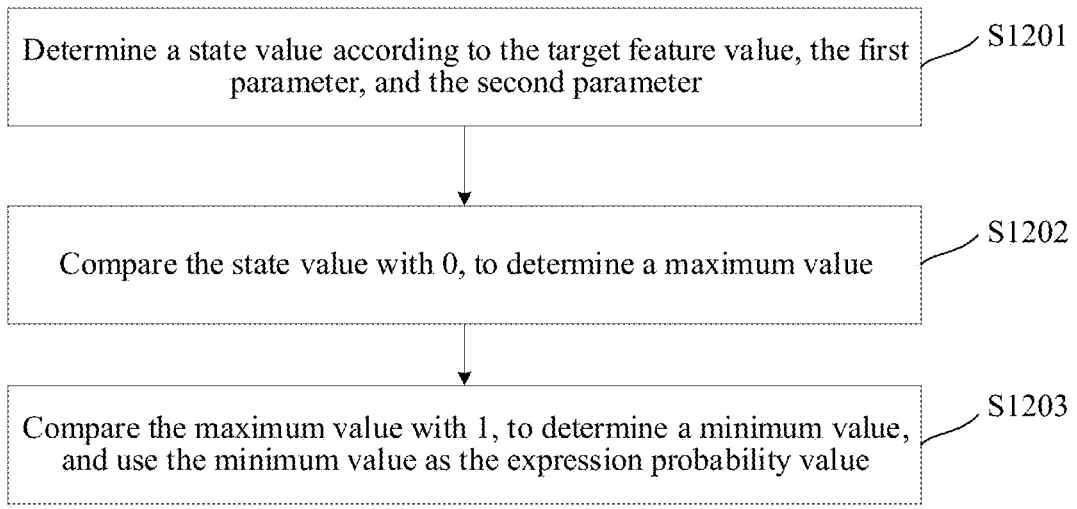
FIG. 12 is a schematic flowchart of a method for obtaining an expression probability value according to an embodiment of this application.

In an embodiment of this application, the first parameter may be a preset slope determined according to the target action unit, and the second parameter is a preset bias value that is set according to the target action unit. FIG. 12 is a schematic flowchart of a method for obtaining an expression probability value, including the following steps: S1201. Determine a state value according to the target feature value, the first parameter, and the second parameter. S1202. Compare the state value with 0, to determine a maximum value. S1203. Compare the maximum value with 1, to determine a minimum value, and use the minimum value as the expression probability value. To make the technical solutions in the embodiments of this application more clearly, the following describes, by using the eyes, the mouth, and the eyebrows as action units, how to determine an expression probability value of each action unit.

Figure 13:
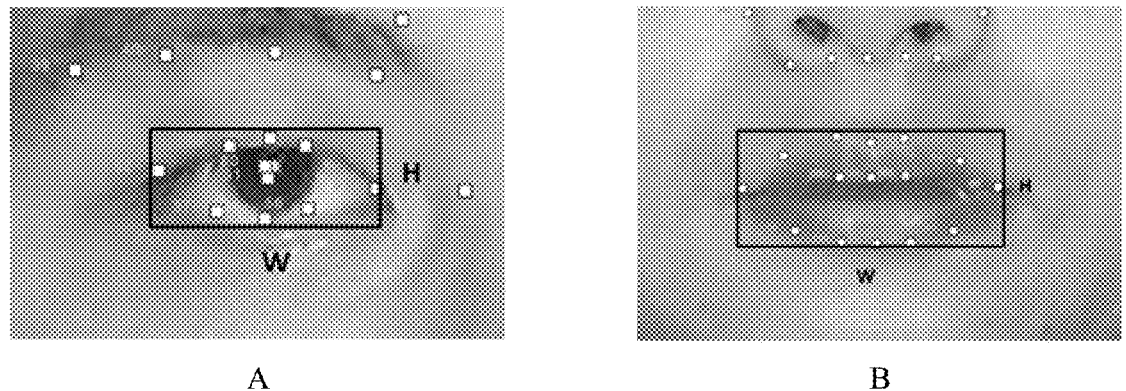
FIG. 13 is a schematic diagram of action units that are open or closed according to an embodiment of this application.

For the opening/closing of the eye or the mouth, an aspect ratio of a circumscribed rectangle of feature points of the eye or the mouth may be used for description, and the aspect ratio is mapped to output a probability of 0-1. When the probability is 0, it indicates that the eye or the mouth is closed. When the probability is not 0, it indicates that the eye or the mouth is open. FIG. 13 is a schematic diagram of action units that are open or closed. As shown in FIG. 13A, the target action unit is a left eye, and key points corresponding to an inner eye corner, an outer eye corner, a highest point of the upper eyelid, and a lowest point of the lower eyelid may be used as feature points. According to the feature points, a circumscribed rectangle may be formed, a height of the circumscribed rectangle is H, and a width is W. As shown in FIG. 13B, the target action unit is a mouth, and key points corresponding to the highest point of the upper lip, the lowest point of the lower lip, and the mouth corners may be used as feature points. According to the feature points, a circumscribed rectangle is formed, and similarly, the circumscribed rectangle also has a corresponding height H and width W.

According to the aspect ratio of the circumscribed rectangle, the first parameter, and the second parameter, the expression probability value of the eye or the mouth may be predicted, and the expression probability value may be calculated by using a formula (1):

$$\text{probability value of opening/closing} = \min\left(\max\left(\text{slope} \times \left(\frac{H}{W}\right) + \text{bias}, 0\right), 1\right) \quad (1)$$

where slope is the first parameter, bias is the second parameter, and $$\frac{H}{W}$$

is the aspect ratio of the circumscribed rectangle.

In an embodiment of this application, the first parameter slope and the second parameter bias may be values set according to experience. For example, for prediction of eye opening/closing, the first parameter slope may be set to 4.55, and the second parameter bias may be set to −0.23; for prediction of mouth opening/closing, the first parameter slope may be set to 1.33, and the second parameter bias may be set to −0.07. For example, after the left eye is determined as the target action unit, a circumscribed rectangle may be formed according to the feature points of the left eye, a height of the circumscribed rectangle is 1 cm, and a width W is 2 cm. Then, the target feature value is 0.5, and a state value is 2.045. 2.045 is compared with 0, and a maximum value can be determined to be 2.045. The maximum value 2.045 is compared with 1, and a minimum value 1 may be obtained. Therefore, a probability value of opening/closing of the left eye is 1, and it indicates that an expression state of the left eye is open.

For the local expression of pouting, measurement may be performed by calculating a slope of a straight line formed by key points of the left/right corner of the mouth, what is outputted is linearly mapped to 0-1 as a degree identifier, and an expression probability value of pouting may be calculated by using a formula (2) or (3):

$$\text{probability value of left pouting} = \min\left(\max\left(\text{slope}_{left} \times \frac{y_{left} - y_{right}}{x_{left} - x_{right}} + \text{bias}_{left}, 0\right), 1\right) \quad (2)$$

$$\text{probability value of right pouting} = \min\left(\max\left(\text{slope}_{right} \times \frac{y_{left} - y_{right}}{x_{left} - x_{right}} + \text{bias}_{right}, 0\right), 1\right) \quad (3)$$

where $\text{slope}_{left}$ and $\text{slope}_{right}$ are first parameters, $\text{bias}_{left}$ and $\text{bias}_{right}$ are second parameters, $(x_{left}, y_{right})$ are key point coordinates corresponding to the left corner of the mouth, and $(x_{right}, y_{left})$ are key point coordinates corresponding to the right corner of the mouth.

In an embodiment of this application, the first parameters $\text{slope}_{left}$ and $\text{slope}_{right}$ and the second parameters $\text{bias}_{left}$ and $\text{bias}_{right}$ may be values set according to experience. For example, $\text{slope}_{left}$ may be set to 18.18, $\text{bias}_{left}$ may be set to −0.27, $\text{slope}_{right}$ may be set to −18.18, and $\text{bias}_{right}$ may be set to −0.27. For example, in a 2D rectangular coordinate system with a positive direction of an x axis pointing towards right and a positive direction of a y axis pointing downward, when the key point coordinates $(x_{left}, y_{right})$ corresponding to the left corner of the mouth are (−0.1, −0.1), and the key point coordinates $(x_{right}, y_{left})$ corresponding to the right corner of the mouth are (0.1, 0.1), the target feature value is 1. According to the formula (2), the state value may be obtained to be 17.91. The state value is compared with 0, and a maximum value is 17.91. Then 17.91 is compared with 1, and a minimum value may be determined to be 1. Therefore, the probability value of left pouting is 1. According to the formula (3), the state value may be obtained to be −18.45. The state value is compared with 0, and a maximum value is 0. Then 0 is compared with 1, and a minimum value may be determined to be 0. Therefore, the probability value of right pouting is 0, and it indicates that the expression of the mouth in the inputted face image is left pouting.

Generally, when a person smiles, the corners of the person's mouth are raised, and when a person is sad, the corners of the person's mouth are lowered. For the local expressions of mouth corner raising and falling, because a curve of the mouth is approximately a parabola after the mouth corners are raised and fall, a method of quadratic function fitting may be used to obtain quadratic curves of inner and outer key points of the upper lip and the lower lip. Specifically, the quadratic curves corresponding to the upper lip and the lower lip may be obtained through minimum mean squared error fitting. Then a bending direction and degree of the mouth may be determined according to coefficients of quadratic terms in the quadratic curves. Finally, the degree is mapped to 0 to 1, and probability values of mouth corner raising and falling may be calculated according to formulas (4) and (5):

$$\text{probability value of mouth corner raising} = \min(\max(\text{slope}_{smile} \times (\alpha_{upper} + \alpha_{lower}) + \text{bias}_{smile}, 0), 1) \quad (4)$$

$$\text{probability value of mouth corner falling} = \min(\max(\text{slope}_{sad} \times (\alpha_{upper} + \alpha_{lower}) + \text{bias}_{sad}, 0), 1) \quad (5)$$

where $\text{slope}_{smile}$ and $\text{slope}_{sad}$ are first parameters, $\text{bias}_{smile}$ and $\text{bias}_{sad}$ are second parameters, $\alpha_{upper}$ is the coefficient of the quadratic term in the quadratic curve corresponding to the upper lip, and $\alpha_{lower}$ is the coefficient of the quadratic term in the quadratic curve corresponding to the lower lip.

In an embodiment of this application, the first parameters $\text{slope}_{smile}$ and $\text{slope}_{sad}$ and the second parameters $\text{bias}_{smile}$ and $\text{bias}_{sad}$ may be values set according to experience. For example, $\text{slope}_{smile}$ may be set to −25, $\text{slope}_{sad}$ may be set to 40, $\text{bias}_{smile}$ may be set to −0.5, and $\text{bias}_{sad}$ may be set to −0.2. For example, in a 2D rectangular coordinate system with a positive direction of an x axis pointing towards right and a positive direction of a y axis pointing downward, when the coefficients of the quadratic terms in the quadratic curves corresponding to the upper lip and the lower lip are respectively 0.3 and 0.5, the target feature value is 0.8. The probability value of mouth corner raising may be obtained to be 0 according to the formula (4), the probability value of mouth corner falling may be obtained to be 1 according to the formula (5), and it indicates that the expression of the mouth in the inputted face image is mouth corner falling.

Figure 14:
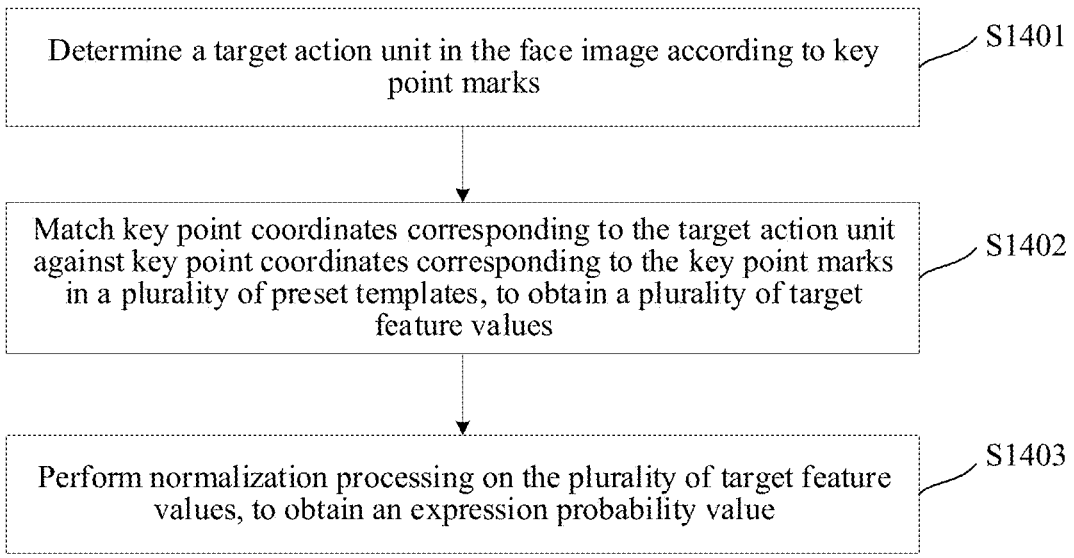
FIG. 14 is a schematic flowchart of recognizing second expression information according to an embodiment of this application.

In the expression prediction of the action unit, it is relatively difficult to predict eyebrow raising and eyebrow shrinking. It is difficult to make a definition from features of several key points. To improve accuracy of expression prediction of eyebrows, a template matching method may be used for recognition. FIG. 14 is a schematic flowchart of recognizing second expression information, including the following steps: S1401. Determine a target action unit in the face image according to the key point marks. The method for determining a target action unit in this step is the same as the method for determining the target action unit shown in FIG. 11, and details are not described herein again. S1402. Match key point coordinates corresponding to the target action unit against key point coordinates corresponding to the key point marks in a plurality of preset templates, to obtain a plurality of target feature values. The preset templates may be facial key points corresponding to natural eyebrows, raised eyebrows, and shrunk eyebrows that are collected in advance. When the key point coordinates corresponding to the target action unit are matched against the key point coordinates corresponding to the key point marks in the preset templates, a first distance between the key point coordinates of the target action unit and a key point with the same key point mark in a natural eyebrow template, a second distance between the key point coordinates of the target action unit and a key point with the same key point mark in an eyebrow raising template, and a third distance between the key point coordinates of the target action unit and a key point with the same key point mark in an eyebrow shrinking template may be obtained. The first distance, the second distance, and the third distance are target feature values. S1403. Perform normalization processing on the plurality of target feature values, to obtain the expression probability value.

In an embodiment of this application, the expression probability value corresponding to the eyebrow may be calculated by using a formula (6):

$$\text{expression probability value of eyebrow} = \text{softmax}([S_{nature}, S_{raise}, S_{shrink}]) \quad (6)$$

where $S_{nature}$ is the first distance, $S_{raise}$ is the second distance, and $S_{shrink}$ is the third distance.

In an embodiment of this application, if the first distance $S_{nature}$ is 0.2 mm, the second distance $S_{raise}$ is 0.3 mm, and the third distance $S_{shrink}$ is 0.5 mm, normalized calculation may be performed to obtain a probability value corresponding to the first distance is 0.29, a probability value corresponding to the second distance is 0.32, and a probability value corresponding to the third distance is 0.39. The maximum probability value 0.39 is selected as the expression probability value of the eyebrow, and it may be determined that the expression of the target action unit in the inputted face image is eyebrow shrinking.

The target feature value may be a value of any type of distance, for example, may be a Euclidean distance, a standardized Euclidean distance, or a cosine distance. This is not specifically limited in this application.

Figure 15:
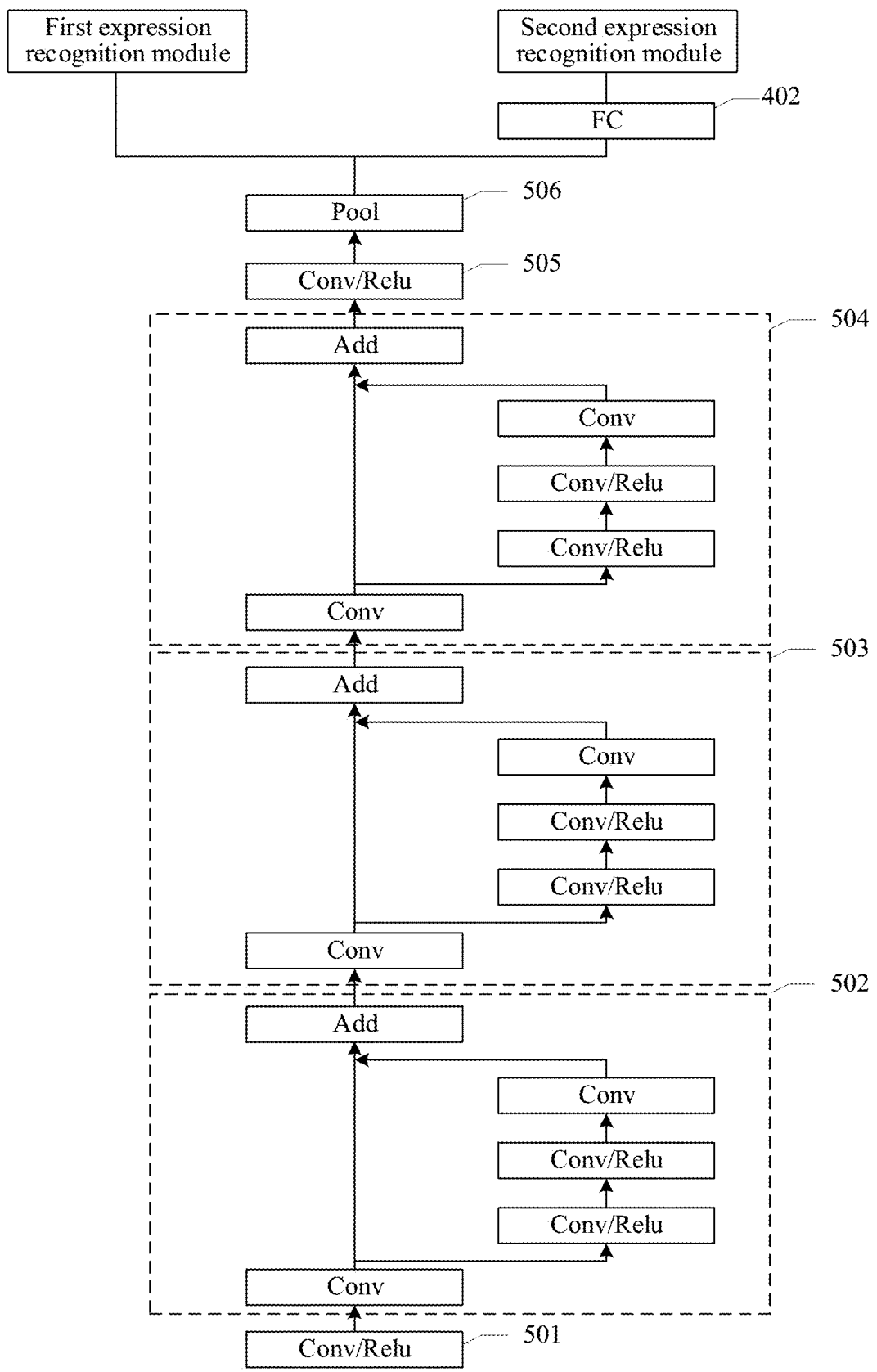
FIG. 15 is a schematic structural diagram of an expression recognition system according to an embodiment of this application.

In an embodiment of this application, an expression recognition system may include the key point learning model 400, the first expression recognition module, and the second expression recognition module. FIG. 15 is a schematic structural diagram of an expression recognition system. As shown in FIG. 15, a branch is connected between the sixth processing unit 506 and the key point recognition network 402 to connect to the first expression recognition module. That is, the first expression recognition module is connected to the pooling layer at the end of the backbone network, to receive the first type information (the local image feature information with category distinction) outputted by the pooling layer, and process the first type information to obtain the first expression information. The first expression information may be an emotion probability value. The second expression recognition module is connected to the key point recognition network 402, to receive the second type information (the key point information), and process the second type information to obtain the second expression information. The second expression information may be an expression probability value of an action unit in the face image.

In an embodiment of this application, the key point learning model 400 and the first expression recognition module are trained separately. After the key point learning model 400 is constructed, the key point learning model 400 is trained first. After the raining of the key point learning model 400 is completed, a weight of the key point learning model 400 is fixed, and the first expression recognition module is trained. Because the weight of the key point learning model 400 is fixed, the to-be-trained first expression recognition module is lightweight, and a network design is simple, it is unnecessary to use a large amount of training data to learn a weight of the first expression recognition module, thereby resolving the problem that the key point learning model 400 relies heavily on data. The calculation amount is small, and the requirement for running on ordinary front-end devices and mobile terminals in real time is met.

Further, predicting the expression probability value of the action unit in the face image by using the target feature value or the template matching method is more lightweight, the algorithm is flexible, and the real-time performance is high, thereby improving user experience.

The expression recognition method provided in the embodiments of this application is applicable to a plurality of products based on AI, including products such as facial expression effects in short videos, video content analysis and matching, and fake face image generation. Analysis results of a plurality of facial expressions are provided by predicting emotions and facial action units of face images in real time.

According to the expression recognition method in the embodiments of this application, 7 predictable emotion categories may be obtained. In methods of playing facial expression effects in videos, a plurality of playing methods are generated according to the predicted emotion categories. For example: (1) Play with stickers according to different expressions in videos. Fireworks are stuck for a happy emotion, a dark cloud is stuck for a sad emotion, and so on. (2) Perform classification according to facial emotions in videos. If a video is classified as a happy video, the video may be classified in the background according to this label, and functions such as automatic editing and background music adding may be performed according to this label. (3) Expression transfer may be performed through an expression label. For example, a natural face is uploaded to generate various faces with other expressions, which may be used in various virtual scenes.

In addition, because an action unit is more specifically determined, there are more playing methods based on facial action units. For example, some animated stickers are provided when the mouth and the eyes are open or closed. Alternatively, when long-distance self-photographing is performed, specific functions of a mobile phone may be triggered through facial actions to be enabled or disabled, thereby saving some troublesome operations for users, and improving user experience.

The following describes apparatus embodiments of this application, which may be used for performing the expression recognition method based on AI in the foregoing embodiments of this application. For details not disclosed in the apparatus embodiments of this application, refer to the foregoing embodiments of the expression recognition method of this application.

Figure 16:
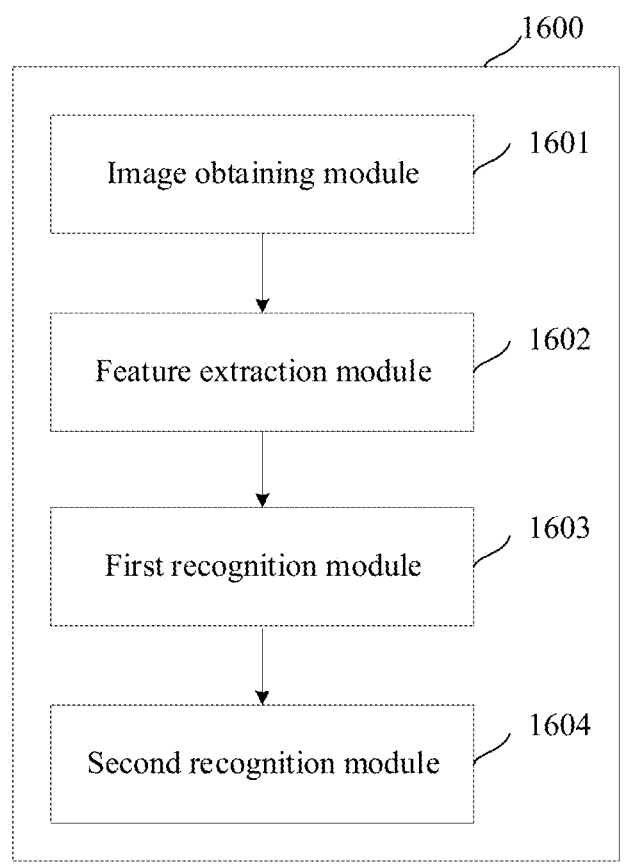
FIG. 16 is a block diagram of an expression recognition apparatus according to an embodiment of this application.

FIG. 16 is a block diagram of an expression recognition apparatus based on AI according to an embodiment of this application.

Referring to FIG. 16, an expression recognition apparatus 1600 according to an embodiment of this application includes: an image obtaining module 1601, a feature extraction module 1602, a first recognition module 1603, and a second recognition module 1604.

The image obtaining module 1601 is configured to obtain a face image. The feature extraction module 1602 is configured to perform feature extraction on the face image, to obtain first type information and second type information. The first recognition module 1603 is configured to obtain global feature information according to the first type information, and determine first expression information according to the global feature information. The second recognition module 1604 is configured to obtain a target feature value according to the second type information, and determine second expression information according to the target feature value.

In an embodiment of this application, the feature extraction module 1602 includes: an input unit, configured to input the face image to a key point learning model, the key point learning model including a backbone network and a key point recognition network connected to the backbone network; a feature extraction unit, configured to perform feature extraction on the face image through the backbone network, to obtain the first type information; and an information processing unit, configured to process the first type information through the key point recognition network, to obtain the second type information.

In an embodiment of this application, the feature extraction unit is configured to: perform convolution-activation-element addition-pooling operations on the face image through the backbone network, to obtain the first type information.

In an embodiment of this application, the key point recognition network is a fully connected layer, and the information processing unit is configured to: integrate the first type information through the fully connected layer, to obtain the second type information.

In an embodiment of this application, the first recognition module 1603 includes: a first recognition unit, configured to integrate the first type information by using a first expression recognition module, to obtain the global feature information; and classify the global feature information, to obtain the first expression information.

In an embodiment of this application, the first expression recognition module is a multi-layer perceptron model, and the multi-layer perceptron model includes a first fully connected layer, a second fully connected layer, and an output layer that are sequentially connected.

In an embodiment of this application, the first expression information is an emotion probability value, and the first recognition unit is configured to: perform multi-dimensional mapping on the first type information through the first fully connected layer, to output feature information; integrate the feature information through the second fully connected layer, to obtain the global feature information; and perform normalization processing on the global feature information through the output layer, to obtain the emotion probability value.

In an embodiment of this application, the second recognition module 1604 includes: a second recognition unit, configured to perform calculation on the second type information by using a second expression recognition module to obtain the target feature value, and determine the second expression information according to the target feature value.

In an embodiment of this application, the second type information includes key point coordinates and key point marks, and the second expression information is an expression probability value corresponding to an action unit in the face image. The second recognition unit includes: a first determining unit, configured to determine a target action unit in the face image according to the key point marks; a second determining unit, configured to determine feature points of the target action unit, and target key point coordinates corresponding to the feature points; a feature value calculation unit, configured to calculate the target feature value according to the target key point coordinates; and a probability calculation unit, configured to obtain the expression probability value according to the target feature value, a first parameter, and a second parameter.

In an embodiment of this application, the target feature value includes at least one of an aspect ratio, a slope, and a curvature, and the first parameter is a preset slope, and the second parameter is a preset bias value.

In an embodiment of this application, the probability calculation unit is configured to: determine a state value according to the target feature value, the first parameter, and the second parameter; compare the state value with the value "0", to determine a maximum value; and compare the maximum value with the value "1", to determine a minimum value, and use the minimum value as the expression probability value.

In an embodiment of this application, the second type information includes key point coordinates and key point marks, and the second expression information is an expression probability value corresponding to an action unit in the face image. The second recognition unit is configured to: determine a target action unit in the face image according to the key point marks; match key point coordinates corresponding to the target action unit against key point coordinates corresponding to the key point marks in a plurality of preset templates, to obtain a plurality of target feature values; and perform normalization processing on the plurality of target feature values, to obtain the expression probability value.

In an embodiment of this application, the expression recognition apparatus 1600 further includes: a coordinate processing module, configured to perform coordinate scale normalization processing on the key point coordinates before the target action unit in the face image is determined according to the key point marks.

Figure 17:
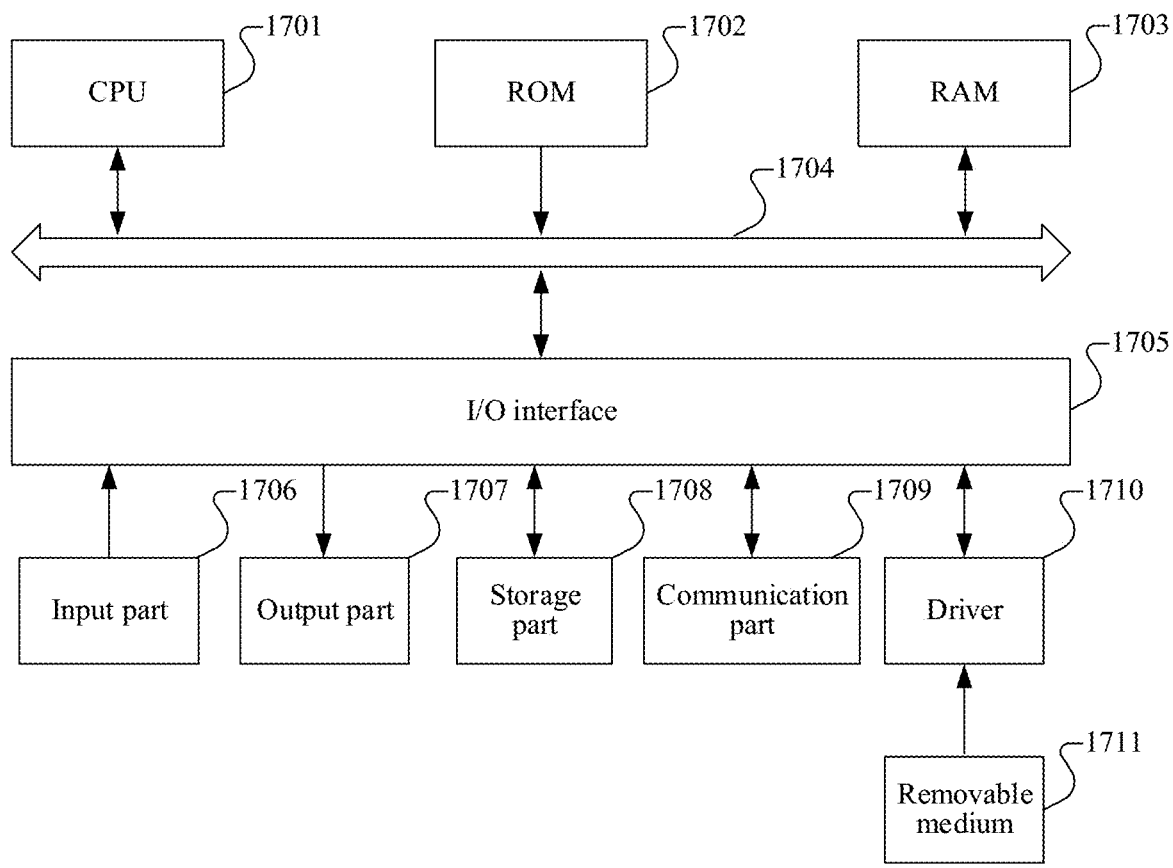
FIG. 17 is a schematic structural diagram of a computer system adapted to implement an electronic device according to an embodiment of this application.

FIG. 17 is a schematic structural diagram of a computer system adapted to implement an electronic device according to an embodiment of this application.

The computer system 1700 of the electronic device shown in FIG. 17 is merely an example, and does not constitute any limitation on functions and use ranges of the embodiments of this application.

As shown in FIG. 17, the computer system 1700 includes a central processing unit (CPU) 1701, which may perform various proper actions and processing based on a program stored in a read-only memory (ROM) 1702 or a program loaded from a storage part 1708 into a random access memory (RAM) 1703. The RAM 1703 further stores various programs and data required for system operations. The CPU 1701, the ROM 1702, and the RAM 1703 are connected to each other through a bus 1704. An input/output (I/O) interface 1705 is also connected to the bus 1704.

The following components are connected to the I/O interface 1705: an input part 1706 including a keyboard, a mouse, or the like, an output part 1707 including a cathode ray tube (CRT), a liquid crystal display (LCD), a speaker, or the like, a storage part 1708 including a hard disk, or the like, and a communication part 1709 including a network interface card such as a local area network (LAN) card or a modem. The communication part 1709 performs communication processing via a network such as the Internet. A driver 1710 is also connected to the I/O interface 1705 as required. A removable medium 1711, such as a magnetic disk, an optical disc, a magneto-optical disk, or a semiconductor memory, is installed on the driver 1710 as required, so that a computer program read from the removable medium is installed into the storage part 1708 as required.

Particularly, according to the embodiments of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part 1709, and/or installed from the removable medium 1711. When the computer program is executed by the CPU 1701, the various functions defined in the system of this application are executed.

The computer-readable medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments perform expression recognition and/or model training. In practical application, the foregoing functions may be allocated to and completed by different functional modules according to requirements, that is, an inner structure of a device is divided into different functional modules to implement all or a part of the functions described above.

What is claimed is:

1. An expression recognition method performed by an electronic device having one or more processors and memory, the method comprising:
    obtaining an image that includes a face, wherein the face includes a plurality of facial action units, a displacement of each facial action unit from its default position indicating an extent of a facial expression associated with the facial action unit;
    performing feature extraction on the image, to obtain global facial expression information corresponding to the face and local facial feature information corresponding to the face, wherein the local facial feature information indicates an extent of the displacement by a corresponding facial action unit in the face;
    determining a global facial emotion probability value according to the global facial expression information;
    determining a local facial feature expression probability value according to the local facial feature information of the corresponding facial action unit in the face; and
    selecting, among a plurality of candidate facial emotions and a plurality of candidate facial expressions, a target facial emotion and a target facial expression corresponding to the target facial emotion for the face in the image according to the global facial emotion probability value and the local facial feature expression probability value.

2. The expression recognition method according to claim 1, wherein performing feature extraction on the face image comprises:
    inputting the image that includes the face to a key point learning model, the key point learning model comprising a backbone network and a key point recognition network connected to the backbone network;
    performing feature extraction on the image through the backbone network, to obtain the global facial expression information; and
    processing the global facial expression information through the key point recognition network, to obtain the local facial feature information.

3. The expression recognition method according to claim 2, wherein performing feature extraction on the face image through the backbone network comprises:
    performing convolution-activation-element addition-pooling operations on the image through the backbone network, to obtain the facial expression information.

4. The expression recognition method according to claim 2, wherein the key point recognition network is a fully connected layer, and processing the facial expression information comprises:
    integrating the facial expression information through the fully connected layer, to obtain the facial feature information.

5. The expression recognition method according to claim 1, wherein determining a global facial emotion probability value according to the global facial expression information comprises:
    integrating the global facial expression information corresponding to the face using a first expression recognition module; and
    classifying the integrated global facial expression information, to obtain the global facial emotion probability value.

6. The expression recognition method according to claim 5, wherein the first expression recognition module is a multi-layer perceptron model, and the multi-layer perceptron model comprises a first fully connected layer, a second fully connected layer, and an output layer that are sequentially connected.

7. The expression recognition method according to claim 6, wherein
    integrating the global facial expression information using the first expression recognition module comprises:
    performing multi-dimensional mapping on the global facial expression information through the first fully connected layer, to output feature information; and
    integrating the feature information through the second fully connected layer, to obtain the integrated global facial expression information; and
    classifying the integrated facial expression information, to obtain the global facial emotion probability value comprises:
    performing normalization processing on the integrated global facial expression information through the output layer, to obtain the global facial emotion probability value.

8. The expression recognition method according to claim 1, wherein determining a local facial feature expression probability value comprises:
    performing calculation on the local facial feature information using a second expression recognition module to obtain a target feature value, and determining the local facial feature expression probability value according to the target feature value.

9. The expression recognition method according to claim 8, wherein the local facial feature information comprises key point coordinates and key point marks, corresponding to a facial action unit in the face; and
    performing calculation on the local facial feature information comprises:
    determining a target facial action unit in the face according to the key point marks;
    determining feature points of the target facial action unit, and target key point coordinates corresponding to the feature points;
    calculating the target feature value according to the target key point coordinates; and
    obtaining the local facial feature expression probability value according to the target feature value, a first parameter, and a second parameter.

10. The expression recognition method according to claim 9, wherein the target feature value comprises at least one of an aspect ratio, a slope, and a curvature of the target facial action unit in the face, and the first parameter is a preset slope, and the second parameter is a preset bias value.

11. The expression recognition method according to claim 9, wherein obtaining the local facial feature expression probability value according to the target feature value, the first parameter, and the second parameter comprises:
    determining a state value according to the target feature value, the first parameter, and the second parameter;
    comparing the state value with the number "0", to determine a maximum value; and
    comparing the maximum value with the number "1", to determine a minimum value, and using the minimum value as the expression probability value.

12. The expression recognition method according to claim 8, wherein the local facial feature information comprises key point coordinates and key point marks, corresponding to a facial action unit in the face; and
    performing calculation on the local facial feature information comprises:
    determining a target facial action unit in the face image according to the key point marks;
    matching key point coordinates corresponding to the target facial action unit against key point coordinates corresponding to the key point marks in a plurality of preset templates associated with the target facial action unit, to obtain a plurality of target feature values; and
    performing normalization processing on the plurality of target feature values, to obtain the local facial feature expression probability value.

13. The expression recognition method according to claim 9, further comprising prior to determining the target facial action unit in the face:
    performing coordinate scale normalization processing on the key point coordinates.

14. An electronic device, comprising:
    one or more processors; and
    memory storing one or more programs, the one or more programs comprising instructions that, when executed by the one or more processors, cause the one or more processors to perform operations comprising:
    obtaining an image that includes a face, wherein the face includes a plurality of facial action units, a displacement of each facial action unit from its default position indicating an extent of a facial expression associated with the facial action unit;
    performing feature extraction on the image, to obtain global facial expression information corresponding to the face and local facial feature information corresponding to the face, wherein the local facial feature information indicates an extent of the displacement by a corresponding facial action unit in the face;
    determining a global facial emotion probability value according to the global facial expression information;
    determining a local facial feature expression probability value according to the local facial feature information of the corresponding facial action unit in the face; and
    selecting, among a plurality of candidate facial emotions and a plurality of candidate facial expressions, a target facial emotion and a target facial expression corresponding to the target facial emotion for the face in the image according to the global facial emotion probability value and the local facial feature expression probability value.

15. The electronic device according to claim 14, wherein performing feature extraction on the face image comprises:
    inputting the image that includes the face to a key point learning model, the key point learning model comprising a backbone network and a key point recognition network connected to the backbone network;
    performing feature extraction on the image through the backbone network, to obtain the global facial expression information; and
    processing the global facial expression information through the key point recognition network, to obtain the local facial feature information.

16. The electronic device according to claim 15, wherein performing feature extraction on the face image through the backbone network comprises:
    performing convolution-activation-element addition-pooling operations on the image through the backbone network, to obtain the facial expression information.

17. The electronic device according to claim 15, wherein the key point recognition network is a fully connected layer, and processing the facial expression information comprises:
    integrating the facial expression information through the fully connected layer, to obtain the facial feature information.

18. The electronic device according to claim 14, wherein determining a global facial emotion probability value according to the global facial expression information comprises:
    integrating the global facial expression information corresponding to the face using a first expression recognition module; and
    classifying the integrated global facial expression information, to obtain the global facial emotion probability value.

19. A non-transitory computer-readable storage medium, storing a computer program, the computer program, when executed by one or more processors of an electronic device, cause the one or more processors to perform operations comprising:
    obtaining an image that includes a face, wherein the face includes a plurality of facial action units, a displacement of each facial action unit from its default position indicating an extent of a facial expression associated with the facial action unit;

performing feature extraction on the image, to obtain global facial expression information corresponding to the face and local facial feature information corresponding to the face, wherein the local facial feature information indicates an extent of the displacement by a corresponding facial action unit in the face;

determining a global facial emotion probability value according to the global facial expression information;

determining a local facial feature expression probability value according to the local facial feature information of the corresponding facial action unit in the face; and selecting, among a plurality of candidate facial emotions and a plurality of candidate facial expressions, a target facial emotion and a target facial expression corresponding to the target facial emotion for the face in the image according to the global facial emotion probability value and the local facial feature expression probability value.

20. The non-transitory computer-readable storage medium according to claim 19, wherein performing feature extraction on the face image comprises:

inputting the image that includes the face to a key point learning model, the key point learning model comprising a backbone network and a key point recognition network connected to the backbone network;

performing feature extraction on the image through the backbone network, to obtain the global facial expression information; and processing the global facial expression information through the key point recognition network, to obtain the local facial feature information.

\* \* \* \* \*